(12) United States Patent
Yamauchi

(10) Patent No.: US 6,847,427 B2
(45) Date of Patent: Jan. 25, 2005

(54) LIQUID CRYSTAL DISPLAY APPARATUS

(75) Inventor: Naofumi Yamauchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 27 days.

(21) Appl. No.: 10/443,224

(22) Filed: May 22, 2003

(65) Prior Publication Data

US 2004/0001173 A1 Jan. 1, 2004

(30) Foreign Application Priority Data

May 24, 2002 (JP) ........................................ 2002-150567

(51) Int. Cl.$^7$ ................................................ G02F 1/13
(52) U.S. Cl. ........................................ 349/113; 349/74
(58) Field of Search ................................ 349/113, 114, 349/74, 96

(56) References Cited

U.S. PATENT DOCUMENTS 5,592,314 A * 1/1997 Ogasawara et al. ........... 349/18
5,742,367 A * 4/1998 Kozaki ........................ 349/64
2004/0100598 A1 * 5/2004 Adachi et al. ............... 349/113

* cited by examiner

Primary Examiner—James A. Dudek
(74) Attorney, Agent, or Firm—Adams & Wilks

(57) ABSTRACT

A liquid crystal display apparatus arranged with a light guide plate of an illuminating apparatus between two liquid crystal panels for increasing an efficiency of utilizing light of the illuminating apparatus to thereby increase brightness both in a transmission display mode and a reflection display mode. For that object, there is constructed a constitution of providing a first lower polarizer between a first liquid crystal panel and a light guide plate, a second lower polarizer between a second liquid crystal panel and the light guide plate and a reflection-polarizing plate between the light guide plate and the second lower polarizer. Thereby, the efficiency of utilizing light of the illuminating apparatus can be increased. Further, a transmission axis of the first lower polarizer and a reflection axis of the reflection-polarizing plate are aligned in the same direction and a transmission axis of the second lower polarizer is set to make an angle $\theta$ (incidentally, $\theta$ is an angle other than 90 degrees) relative to the reflection axis of the reflection-polarizing plate. A rate of reflection/transmission of the second liquid crystal panel can freely be set by changing the angle.

7 Claims, 9 Drawing Sheets

LIQUID CRYSTAL DISPLAY APPARATUS

BACKGROUND OF THE INVENTION

The present invention relates to a liquid crystal display apparatus used in timepiece, portable telephone, audio, electronic apparatus and the like and relates to a constitution of increasing brightness of a liquid crystal display apparatus. In details, the invention relates to a liquid crystal display apparatus capable of carrying out both displays of a reflection type display utilizing external light which is light of an environment of use and a transmission type display utilizing illuminating light of back light or the like.

A liquid crystal panel (LCD) used in a liquid crystal display apparatus generally uses liquid crystals of a TN (twisted nematic) type or an STN (super-twisted nematic) type and is constructed by two sheets of substrates opposed to each other by interposing a liquid crystal layer in which liquid crystal molecules are twisted to align as a principal constitution. Further, polarizers are respectively arranged on a front face side and a back face side of the liquid crystal panel. According to the liquid crystal display apparatus having such a constitution, operation principle of display is established by bringing about a change in an aligning state or phase of the liquid crystal molecules by an electric field, current or temperature rise to thereby change optical properties of interference, scattering, diffraction, optical rotation, selective scattering, adsorption of light or the like in a liquid crystal state. Further, display is realized by controlling a liquid crystal layer by applying voltage between electrodes provided at the respective substrates for forming pixels.

Further, since the liquid crystal panel is nonluminous, a reflector or aback light is generally used. There is a liquid crystal display apparatus for carrying out both display modes of a reflection type display utilizing external light of natural light, interior light or the like and a transmission type display utilizing illuminating light from a back light such that display can be observed both in a bright place and in a dark place. As a constitution of such a liquid crystal display apparatus, there is generally known a constitution including a transflective reflector having a function of transmitting a portion of incident light and reflecting other portion thereof on a back side of a liquid crystal panel and a back light which is an illumination source. Such a constitution is called as a transflective display apparatus.

A transflective type liquid crystal display apparatus of a related art will be explained in reference to FIG. 10. Both sides of a liquid crystal panel 1 are provided with an upper polarizer 2 and a lower polarizer 3 and a back light 5 which is an illuminating apparatus is provided on a back side of the lower polarizer via a transflective reflecting plate 30. The back light 5 is provided with a light guide plate 7, a light source 6 provided at a side face of the light guide plate 7, and a reflecting layer 20 as illustrated.

In the liquid crystal display apparatus having such a constitution, when the liquid crystal panel 1 is displayed by utilizing external light, a light incident on the upper polarizer 2 transmits through the liquid crystal panel 1, and the lower polarizer 3 and a portion of light thereof is reflected by the transflective reflector 30. The light reflected by the transflective reflector 30 reaches an observer by transmitting through the lower polarizer 3, the liquid crystal panel 1 and the upper polarizer 2 again. Thereby, information displayed on the liquid crystal panel 1 can be seen. Next, an explanation will be given of a case of displaying the liquid crystal panel 1 by utilizing light of the back light. A portion of illuminating light illuminated by the back light 5 transmits through the transflective reflector 30. The transmitted light is incident on the liquid crystal panel 1 from a back face thereof by further transmitting through the lower polarizer 3 and is emitted to a front side of the display panel. The emitted light reaches the observer by transmitting through the upper polarizer 2. Thereby, information displayed on the liquid crystal panel 1 can be seen.

However, according to the transflective reflector used in the transflective type liquid display apparatus of the related art, when a rate of reflection is increased, a rate of transmission is reduced, conversely, when the rate of transmission is increased, the rate of reflection is reduced. Therefore, in the case of increasing the rate of reflection, when external light is utilized, the display becomes bright, however, when the back light is used, the display becomes dark. Conversely, in the case of increasing the rate of transmission, when the back light is utilized, the display becomes bright, however, when external light is used, the display becomes dark. In this way, according to the liquid crystal display apparatus using the transflective reflector, there poses a problem that the display cannot become bright in both of the external light and the back light. Further, since the transflective reflector and the reflector on the back side of the back light are used, constituent members are thickened and cause to increase the cost. Hence, it is an object of the invention to realize a constitution capable of carrying out bright display by increasing an efficiency of utilizing light from a light source by a compact constitution. Further, it is an object of the invention to realize a liquid crystal display apparatus of a two faces display type having a high efficiency of utilizing light from a light source.

SUMMARY OF THE INVENTION

In order to resolve the above-described problem, the invention is constructed by a constitution of successively providing a lower polarizer, an illuminating apparatus, and a reflection-polarizing plate reflecting a polarized light component in a specific direction and transmitting a remaining polarized light component on a back side of a liquid crystal panel and aligning a direction of a transmission axis of the lower polarizer and a reflection axis of the reflection-polarizing plate. Thereby, an equivalent brightness can be ensured by a constitution of parts smaller than those in the related art.

Further, in a display apparatus arranged with two liquid crystal panels interposing a light guide plate of an illuminating apparatus, there are provided a first lower polarizer provided between a first liquid crystal panel and the light guide plate, a second lower polarizer provided between a second liquid panel and the light guide plate and a reflection-polarizing plate provided between the light guide plate and the second lower polarizer. Thereby, an efficiency of utilizing light of the illuminating apparatus is increased and bright two faces display can be carried out. Further, a transmission axis of the first lower polarizer and a reflection axis of the reflection-polarizing plate are aligned in the same direction and a transmission axis of the second lower polarizer is set to make angle θ (incidentally, θ is angle other than 90 degrees) relative to the reflection axis of the reflection-polarizing plate. A rate of reflection/transmission of the second liquid crystal panel can freely be set by changing the angle.

Further, a second reflection-polarizing plate is provided between the reflection-polarizing plate and the second lower polarizer.

Further, a third reflection-polarizing plate is provided between the first lower polarizer and the illuminating apparatus.

DETAILED DESCRIPTION OF THE PREFERRED EMBODIMENTS

Figure 1:
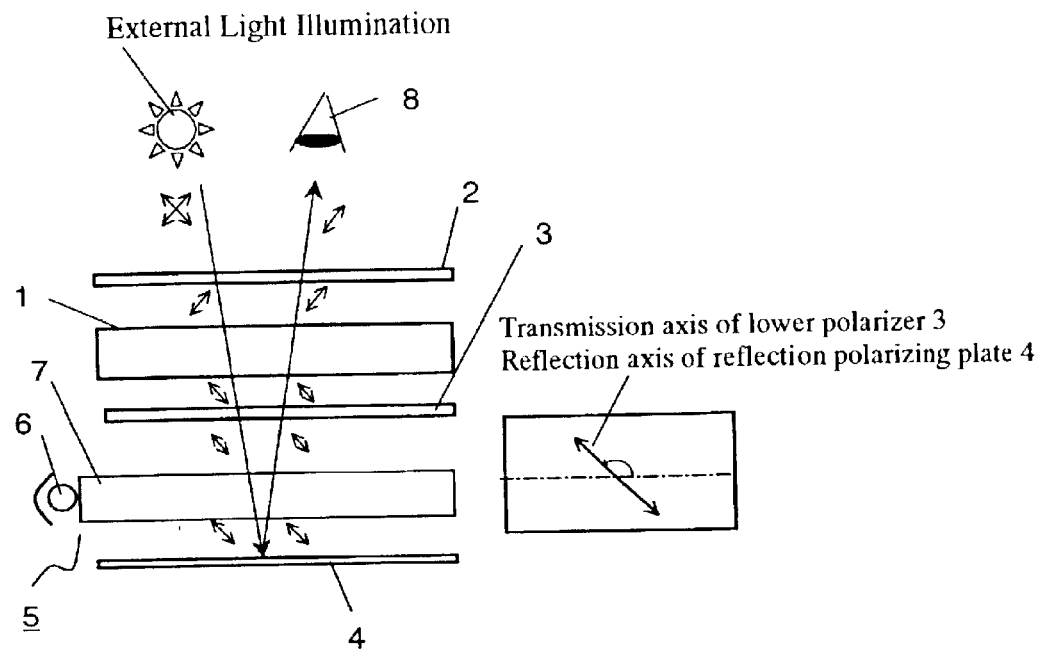
FIG. 1 is a sectional constitution view of a liquid crystal display apparatus according to a first embodiment of the invention schematically showing a case of observing by utilizing external light.

The liquid crystal display apparatus according to the invention is provided with a liquid crystal panel interposing a liquid crystal between substrates opposed to each other, a lower polarizer provided on a back side of the liquid crystal panel, an illuminating apparatus provided on a back side of the lower polarizer and a reflection-polarizing plate provided on a back side of the illuminating apparatus and a transmission axis of the lower polarizer and a reflection axis of the reflection-polarizing plate are in the same direction. Here, the reflection-polarizing plate is provided with a function of reflecting a polarized light component in a specific direction and transmitting a remaining polarized light component. Further, the illuminating apparatus is provided with a function of radiating illuminating light to the liquid crystal panel and transmitting light in an up and down direction.

Further, a liquid crystal display apparatus having liquid crystal panels on both sides thereof is provided with an illuminating apparatus provided for illuminating a first liquid crystal panel and a second crystal panel, a first lower polarizer provided between the first liquid crystal panel and the illuminating apparatus, a second lower polarizer provided between the second liquid crystal panel and the illuminating apparatus and a reflection-polarizing plate provided between the illuminating apparatus and the second lower polarizer. Here, the reflection-polarizing plate is provided with the function of reflecting a polarized light component in a specific direction and transmitting a remaining polarized light component. Further, the illuminating apparatus is provided with the function of radiating illuminating light to the liquid crystal panel and transmitting light in an up and down direction. Further, a transmission axis of the first lower polarizer and a reflection axis of the reflection-polarizing plate are aligned in the same direction and a transmission axis of the second lower polarizer is set to make an angle other than 90 degrees relative to the reflection axis of the reflection-polarizing plate. By constituting in this way, brightness for displaying second liquid crystal panel can be adjusted in accordance with the angle made by the transmission axis of the, second lower polarizer and the reflection axis of the reflection-polarizing plate.

Further, a second reflection-polarizing plate is provided between the reflection-polarizing plate and the second lower polarizer and a reflection axis of the second reflection-polarizing plate is set to be orthogonal to the transmission axis of the second lower polarizer. Thereby, multiple reflection is brought about between the reflection-polarizing plate and the second reflection-polarizing plate and illuminating light from the illuminating apparatus can efficiently be utilized in the liquid crystal panel.

Further, a third reflection-polarizing plate is provided between the first lower polarizer and the illuminating apparatus and a reflection axis of the third reflection-polarizing plate is set to be orthogonal to the reflection axis of the reflection-polarizing plate. Thereby, multiple reflection is brought about between the reflection-polarizing plate and the second reflection-polarizing plate and between the reflection-polarizing plate and the third reflection-polarizing plate and illuminating light from the illuminating apparatus and light incident by transmitting the upper polarizer from outside can efficiently be utilized for displaying the liquid crystal panel.

The illuminating apparatus in which light is emitted from a light source to two faces thereof and light is transmitted in a thickness direction may be used. Specifically, a back light of a side light type using a light guide plate, a transparent inorganic EL, a transparent organic EL, a plane discharge tube or the like can be exemplified. An explanation will be given of respective embodiments, mentioned later, by taking an example of a case of using a back light illuminating apparatus of a side light type using a light guide plate.

Generally, there are a reflection-polarizing plate laminated with two kinds of elongated multilayer films having different diffractive indices and a reflection-polarizing plate combined with a circularly polarizer and a high molecular liquid crystal aligned and fixed spirally in a film thickness direction. Either of the reflection-polarizing plates can be used. In the following respective embodiments, the case of using a film of elongated multilayer films will be explained.

Embodiments of the invention will be explained in details in reference to the drawings as follows.

(Embodiment 1)

Figure 2:
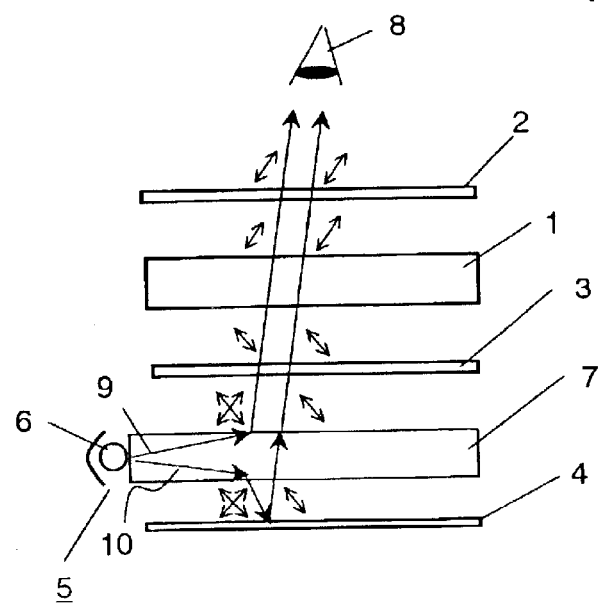
FIG. 2 is a sectional constitution view of the liquid crystal display apparatus according to the first embodiment of the invention schematically showing a case of observing by utilizing an illuminating apparatus.

FIG. 1 and FIG. 2 are views schematically showing a sectional structure of a liquid crystal display apparatus according to the invention. Particularly, FIG. 1 shows a state of utilizing external light and FIG. 2 shows a state of utilizing illuminating light by a back light.

As illustrated, an upper polarizer 2 is provided on an upper side of a liquid crystal panel 1 and a lower polarizer 3 is provided on a lower side thereof, respectively. A light guide plate 7 for constituting a back light 5 is provided on a back side of the lower polarizer 3. A reflection-polarizing plate 4 is arranged on a back side of the light guide plate 7. Further, although in the drawings, in order to facilitate to understand the characteristics of the invention, optical elements of the polarizer, the reflection-polarizing plate and the like are represented by separating the optical elements from other constituent elements, the optical elements can also be bonded to other constituent elements of the liquid crystal panel and the like by an adhesive.

Next, the respective constituent elements will be explained. The liquid crystal panel 1 is constructed by a structure of interposing liquid crystals by transparent substrates of glass substrates or plastic substrates. The transparent substrate is provided with an electrode for display and display is carried out by controlling alignment of liquid crystal molecules by applying voltage to a liquid crystal layer. The polarizer is provided with a function of absorbing a specific linearly polarized light component and transmitting the other polarized light component. The back light 5 is provided with the light guide plate 7 and a light source 6 arranged at a side of a side face of the light guide plate. The light guide plate 7 is provided with a function of radiating light of the light source incident from the side face direction to the liquid crystal panel 1 and is further provided with a function of transmitting light in a thickness direction (up and down direction). Further, the reflection-polarizing plate 4 is provided with a function of reflecting a specific linearly polarized light component and transmitting the other polarized light component. Further, a polarizing direction of light reflected by the reflection-polarizing plate 4 (reflection axis) and an absorption axis of the lower polarizer 3 are made orthogonal to each other such that light transmitting the lower polarizer 3 is efficiently reflected by the reflection-polarizing plate 4. Here, the absorption axis of the polarizer represents a polarizing direction of light absorbed by the polarizer and a direction orthogonal to the absorption axis is represented as a transmission axis. That is, the reflection axis of the reflection-polarizing plate 4 and the transmission axis of the lower polarizer 3 are set to coincide with each other. Further, when a light scattering layer is provided somewhere between the reflection-polarizing plate 4 and the upper polarizer 2, it is effective in preventing mirror face reflection from being brought about in the case of observing the reflection display.

The operation principle of the liquid crystal display apparatus having such a constitution will be explained.

In the case of refection display, light is incident on the display element from a side of an observer. In this case, light transmits through the upper polarizer 2 and therefore, linearly polarized light in a direction of an absorption axis of the upper polarizer is absorbed and the remaining transmitting component is incident on the display panel. At an OFF region of the liquid crystal layer, the incident light is emitted from the liquid crystal panel 1 while converting a polarizing direction thereof in accordance with a twist angle of liquid crystal molecules, a polarized light component coinciding with an absorption axis of the lower polarizer is absorbed by the lower polarizer 3 and the remaining component transmits through the lower polarizer 3. Here, when the absorption axis of the upper polarizer 2 and the absorption axis of the lower polarizer 3 are set to be substantially orthogonal to each other, display of bright can be carried out at the OFF region and display of dark can be carried out at an ON region, and when the absorption axis of the upper polarizer 2 and the absorption axis of the lower polarizer 3 are set to be in parallel with each other, display of dark can be carried out at the OFF region and display of bright can be carried out at the ON region.

In this way, light transmitting through the lower polarizer 3 reaches the reflection-polarizing plate 4 by transmitting through the light guide plate 7. As described above, the transmission axis of the lower polarizer 3 and the reflection axis of the reflection-polarizing plate 4 are set to coincide with each other and therefore, light transmitting through the lower polarizer 3 can efficiently be reflected by the reflection-polarizing plate 4. The reflected light reaches an observer 8 by a route reverse to the above-described, that is, the light guide plate 7, the lower polarizer 3, the liquid crystal panel 1 and the upper polarizer 2.

On the other hand, the case of transmission display, that is, the case of display by illuminating light from a back face side (back light 5) will be explained. First, illuminating light emitted from the light guide plate 7 to the side of the liquid crystal panel will be explained. Although the illuminating light in this case includes light in various polarizing directions, in the light, a polarized light component in the direction of the absorption axis of the lower polarizer 3 is absorbed by the lower polarizer 3 and the remaining component transmits through the lower polarizer 3. The transmitted component is emitted from the liquid crystal panel 1 while a polarizing direction thereof is converted by the liquid crystal layer. In the emitted light, a polarized light component in a direction the same as that of the absorption axis of the upper polarizer 2 is absorbed and the remaining component reaches the observer by transmitting therethrough. Here, the polarizing direction of the emitted light and the transmission axis of the upper polarizer 2 are aligned and therefore, the observer 8 can observe the emitted light.

Next, illuminating light emitted from the light guide plate 7 to the side of the reflection-polarizing plate on a side opposed to the liquid crystal panel will be explained. Although the illuminating light in this case includes light in various polarizing direction, in the light, a polarized light component in a direction of the reflection axis of the reflection-polarizing plate is reflected by the reflection-polarizing plate 4, directed to the lower polarizer 3 via the light guide plate 7 and the remaining component transmits through the reflection-polarizing plate 4. Since the reflection axis of the reflection-polarizing plate 4 and the transmission axis of the lower polarizer 3 coincide with each other, the component reflected by the reflection-polarizing plate 4 reaches the observer 8 similar to the above-described explanation. Although according to the constitution of the related art in which the reflector is arranged on the lower side of the light guide plate 7, light reflected by the reflector does not transmit to the back side as in the invention, the transmitted component is a component which cannot transmit through the lower polarizer 3 and therefore, does not reach the observer at any rate and the constitution of the invention does not deteriorate the efficiency of utilizing light. In this way, the illuminating light can effectively be utilized by using the reflection-polarizing plate even when the reflector is not used on the lower side of the light guide plate. Further, it is not necessary to provide the transflective reflector between the lower polarizer and the light guide plate.

(Embodiment 2)

The embodiment is constructed by a constitution of providing a second reflection-polarizing plate on a back side of the reflection-polarizing plate in addition to the above-described constitution of Embodiment 1. A reflection axis of the second reflection-polarizing plate is set to be orthogonal to the reflection axis of the reflection-polarizing plate.

(Embodiment 3)

The embodiment is constructed by a constitution of providing a third reflection-polarizing plate between the light guide plate and the lower polarizer in addition to the above-described constitution of Embodiment 2. A reflection axis of the third reflection-polarizing plate is set to be orthogonal to the reflection axis of the reflection-polarizing plate.

(Embodiment 4)

The embodiment is an example of applying the constitution of Embodiment 1 to a two faces panel. That is, the embodiment is an embodiment of a two faces panel structure arranged with another display panel on the back side of the reflection-polarizing plate. A constitution of the invention will be explained in details in reference to FIG. 3 and FIG. 4. Further, an explanation duplicated with that of Embodiment 1 may be omitted.

As illustrated, two of liquid crystal panels are provided on both sides of the light guide plate 7 constituting the back light. The lower polarizer 3 is provided between the liquid crystal panel 1 and the light guide plate 7 and the upper polarizer 2 is provided on the upper side of the liquid crystal panel 1 (on the side of the observer 8). Further, a second lower polarizer 13 is provided between a second liquid crystal panel 11 and the light guide plate 7 and a second upper polarizer 12 is provided on a side of an observer 18 of the second liquid crystal panel 11. Further, the reflection-polarizing plate 4 is arranged between the light guide plate 7 and the second lower polarizer 13. Here, a polarizing direction of light reflected by the reflection-polarizing plate 4 (reflection axis) and the absorption axis of the lower polarizer 3 are made to be orthogonal to each other such that light transmitting through the lower polarizer 3 is efficiently reflected by the reflection-polarizing plate 4. That is, the reflection axis of the reflection-polarizing plate 4 and the transmission axis of the lower polarizer 3 are set to coincide with each other. Further, a transmission axis of the second lower polarizer 13 is set to make an angle θ (incidentally, θ is an angle other than 90 degrees) relative to the reflection axis of the reflection-polarizing plate 4. θ may be on a plus side or on a minus side. However, it is preferable to set a polarizing direction of light emitted from the second liquid crystal panel 11 to the second lower polarizer to coincide with the transmission axis of the second lower polarizer 13.

A simple explanation will be given of the operation principle of the liquid crystal apparatus having such a constitution.

Figure 3:
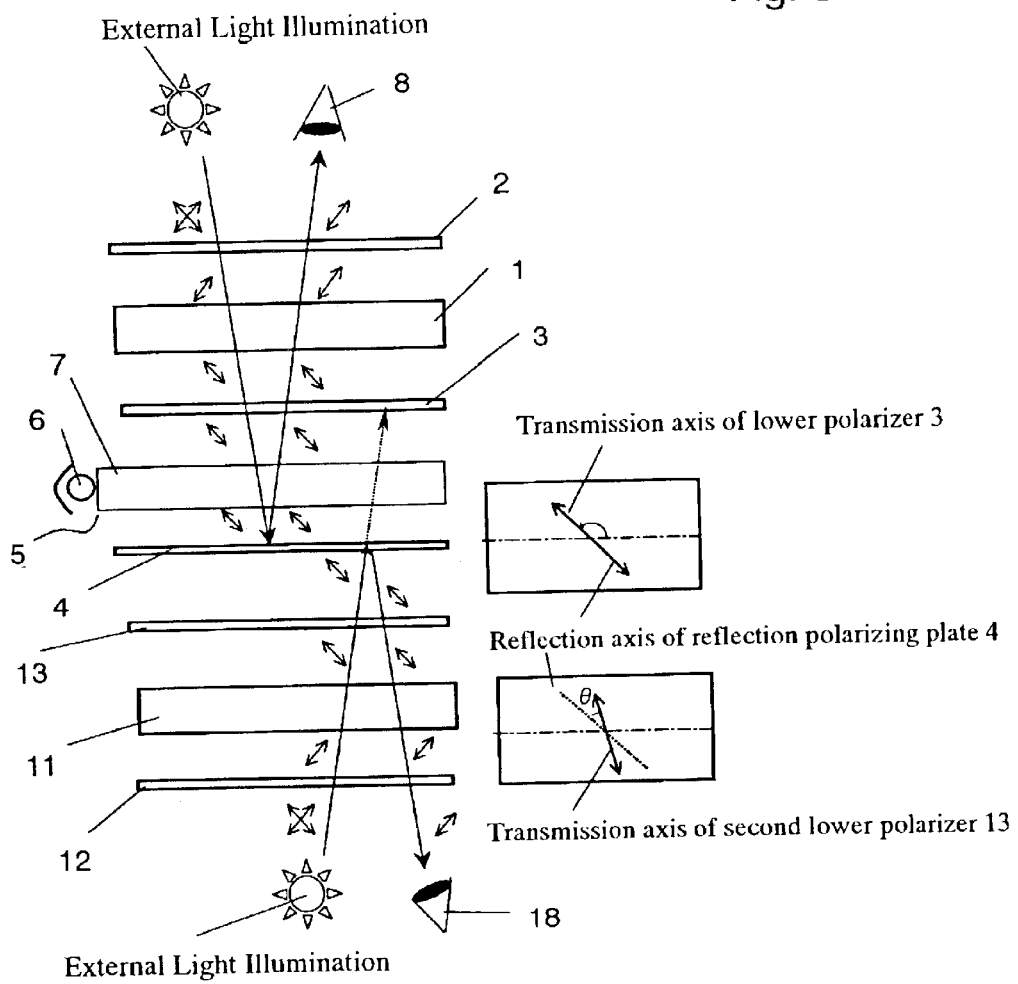
FIG. 3 is a sectional constitution view of a liquid crystal display apparatus according to a fourth embodiment of the invention schematically showing a case of observing by utilizing external light.
Figure 4:
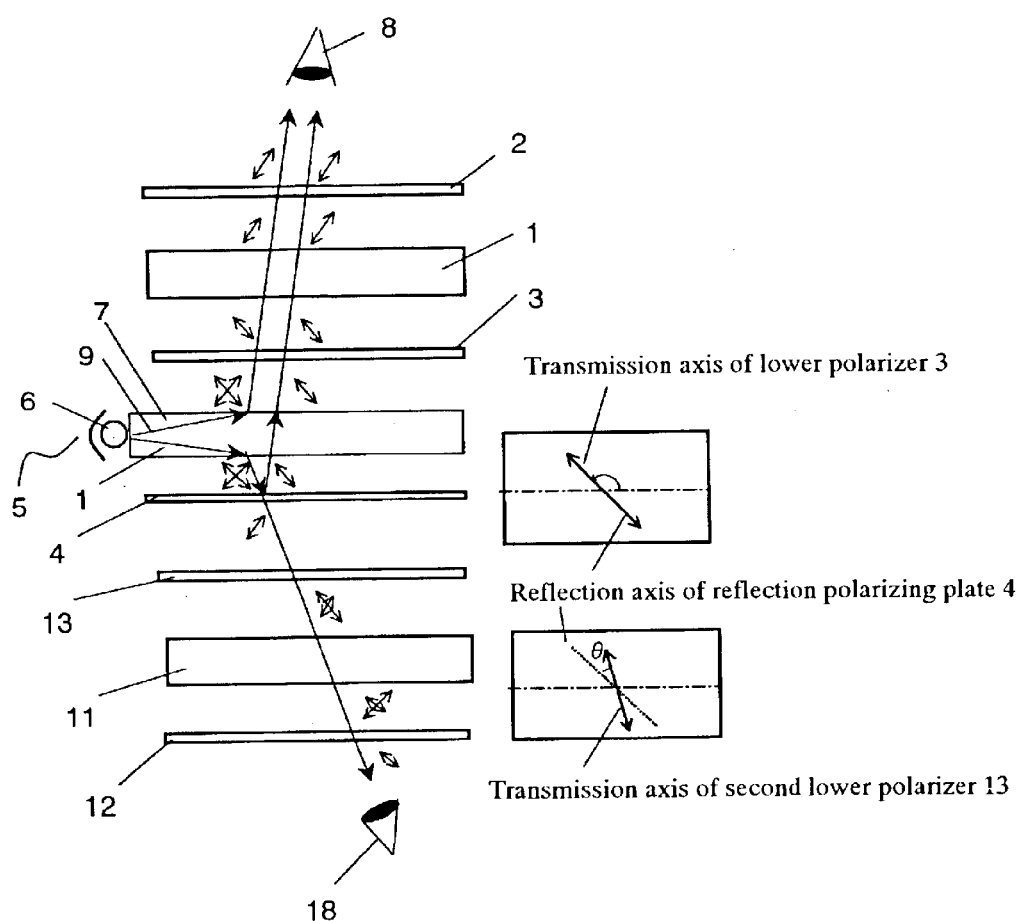
FIG. 4 is a sectional constitution view of the liquid crystal display apparatus according to the fourth embodiment of the invention schematically showing a case of observing by utilizing an illuminating apparatus.

First, the case of observing the liquid crystal panel 1 will be explained in reference to FIGS. 3 and 4. The case is similar to the above-described case of Embodiment 1. That is, in the case of observing the liquid crystal panel 1 by reflection display, as shown by FIG. 3, when external light incident on the display element from the observer side 8 transmits through the upper polarizer 2, a linearly polarized light in the direction of the absorption axis of the upper polarizer 2 is absorbed and the remaining component is incident on the liquid crystal panel 1. The incident light is emitted from the liquid crystal panel 1 while the polarizing direction is converted in accordance with the twist angle of the liquid crystal molecules. In the emitted light, the polarizing light component coinciding with the absorption axis of the lower polarizer 3 is absorbed by the lower polarizer 3 and the remaining component transmits through the first lower polarizer 3. Light transmitting through the first lower polarizer 3 reaches the reflection-polarizing plate 4 by transmitting through the light guide plate 7. Here, the transmission axis of the first lower polarizer 3 and the reflection axis of the reflection-polarizing plate 4 are set to coincide with each other and therefore, a component (light) transmitting through the first lower polarizer 3 is reflected by the reflection-polarizing plate 4 efficiently while maintaining the polarizing direction. Reflection in this case is total reflection. The reflected light reaches the observer 8 by transmitting through the route reverse to the above-described, that is, the polarizer 7, the lower polarizer 3, the liquid crystal panel 1 and the upper polarizer 2. Next, the case of observing the liquid crystal panel 1 by transmission display will be explained in reference to FIG. 4. The polarized light component in a direction of the absorption axis of the lower polarizer 3 of the illuminating light 9 emitted from the light guide plate 7 to the side of the liquid crystal panel 1 is absorbed by the lower polarizer 3 and the remaining component transmits therethrough. Meanwhile, the polarized light component in the direction of the reflection axis of the reflection-polarizing plate of the illuminating light 10 emitted from the light guide plate 7 to the side of the reflection-polarizing plate is reflected by the reflection-polarizing plate 4 while maintaining the polarizing direction and the remaining component transmits through the reflection-polarizing plate 4. Light reflected by the reflection-polarizing plate 4 is directed to the lower polarizer 3 by transmitting through the light guide plate 7. The reflection axis of the reflection-polarizing plate 4 and the transmission axis of the lower polarizer 3 are set to be in parallel with each other and therefore, the illuminating light reflected by the reflection-polarizing plate 4 transmits through the lower polarizer 3 as it is. In this way, both of the illuminating light 9 and 10 from the back light are the polarized light components in the same direction after transmitting through the lower polarizer 3. Further, the light transmitting through the lower polarizer 3 is emitted from the liquid crystal panel 1 while converting the polarizing direction by the liquid crystal layer. In the emitted light, a polarized light component in a direction the same as the absorption axis of the upper polarizer 2 is absorbed thereby and the remaining component reaches the observer by transmitting therethrough. Here, the polarizing direction of the emitted light and the transmission axis of the upper polarizer 2 coincide with each other and therefore, the observer 8 can observe the emitted light.

Next, the case of observing the second liquid crystal panel 11 will be explained. First, the case of observing the second liquid crystal panel 11 by reflection display will be explained in reference to FIG. 3. The polarized light component in a direction of an absorption axis of the second upper polarizer 12 of external light incident on the display element from the side of the observer 18 is absorbed when transmitting through the second upper polarizer 12 and the remaining component is incident on the second liquid crystal panel 11. The incident light is emitted from the second liquid crystal panel 11 while converting a polarizing direction in accordance with a twist angle of the liquid crystal molecules, a polarized light component coinciding with an absorption axis of the second lower polarizer is absorbed by the second lower polarizer 13 and the remaining component transmits therethrough. Further, light transmitting through the second lower polarizer 13 reaches the reflection-polarizing plate 4. In this case, the transmission axis of the second lower polarizer 13 is set to shift from the reflection axis of the reflection-polarizing plate 4 by an angle θ. Therefore, in the polarized component transmitting trough the second lower polarizer 13, a component in the direction of the reflection axis of the reflection-polarizing plate 4 is reflected by the reflection-polarizing plate 4, transmits through the second lower polarizer 13 again, tracks back the incident path, emitted from the second upper polarizer 12 and reaches the observer 18. Meanwhile, a component thereof which is not in the direction of the reflection axis of the reflection-polarizing plate 4, that is, a component in the direction of the transmission axis of the reflection-polarizing plate 4 transmits through the reflection-polarizing plate 4. Further, the component reaches the lower polarizer 3 via the light guide plate 7. The light reaching the lower polarizer 3 (component in the direction of the transmission axis of the reflection-polarizing plate 4) is in a polarizing direction the same as the absorption axis of the lower polarizer 3 and therefore, the component is absorbed by the lower polarizer 3.

Here, when θ=0, that is, when the transmission axis of the second lower polarizer 13 and the reflection axis of the reflection-polarizing plate 4 coincide with each other, the component (light) transmitting through the second lower polarizer 13 is reflected by the reflection-polarizing plate 4 while maintaining the polarizing direction. Further, the reflected light reaches the observer 18 by transmitting through the second lower polarizer 13, the second liquid crystal panel 11 and the second upper polarizer again. Therefore, when θ=0, the second display element carries out reflection display and illuminating light from the side of the light guide plate does not reach the side of the observer 18 as described later. As θ increases (however, θ<90°), a rate of transmitting the reflection-polarizing plate 4 from the side of the second liquid crystal panel 11 is increased and a rate of reflecting thereby is reduced.

Further, when θ=90°, that is, when the transmission axis of the second lower polarizer 13 and the reflection axis of the reflection-polarizing plate 4 are orthogonal to each other, the component (light) transmitting through the second lower polarizer 13 transmits through the reflection-polarizing plate 4, is absorbed by the lower polarizer 3 and does not reach the observer. That is, the observer cannot observe display of the second liquid crystal panel 11.

In this way, a reflectance of the second liquid crystal panel (rate of reflecting light transmitting through the lower polarizer 13 by the reflection-polarizing plate 4) is represented by $(\sin\theta)^2$ when an angle made by the reflection axis of the reflection-polarizing plate 4 and the transmission axis of the second lower polarizer 13 is designated by notation θ. That is, a rate of reflection/transmission of the second liquid crystal panel can freely be set by changing the angle. In order to increase the rate of reflection, the angle may be proximate to 0° and in order to increase the rate of transmission, the angle may be proximate to 90°.

Next, the case of observing the second liquid crystal panel 11 by transmission display will be explained in reference to FIG. 4. A polarized light component in a direction of the reflection axis of the reflection-polarizing plate of the illuminating light 10 emitted from the light guide plate 7 to the side of the second liquid crystal panel is reflected by the reflection-polarizing plate 4 and the remaining component transmits through the reflection-polarizing plate 4. Light transmitting through the reflection-polarizing plate 4 reaches the second lower polarizer 13. In components of light transmitting through the reflection-polarizing plate 4, a component in a direction of the transmission axis of the second lower polarizer 13 transmits through the second lower polarizer 13, transmits through the second liquid crystal panel 11 and the second upper polarizer 12 and reaches the observer 18. Meanwhile, in the components of light transmitting through the reflection-polarizing plate 4, the remaining component, that is, a component in a direction of the absorption axis of the second lower polarizer 13 is absorbed by the lower polarizer and hardly reaches the observer 18. In this case, the transmission axis of the second lower polarizer 13 is set to shift from the reflection axis of the reflection-polarizing plate 4 by the angle θ. Therefore, an amount of light reaching the observer 18 is changed in accordance with the angle θ. For example, when θ=90°, that is, when the transmission axis of the second lower polarizer 13 and the reflection axis of the reflection-polarizing plate 4 are orthogonal to each other, light transmitting through the reflection-polarizing plate 4 from the light source side transmits through the second lower polarizer as it is and the amount of light reaching the observer 18 is maximized. Meanwhile, when θ=0°, that is, when the transmission axis of the second lower polarizer 13 and the reflection axis of the reflection-polarizing plate 4 coincide with each other, light transmitting through the reflection-polarizing plate 4 from the light source side is absorbed by the second lower polarizer and the amount of light reaching the observer 18 is minimized.

(Embodiment 5)

Figure 5:
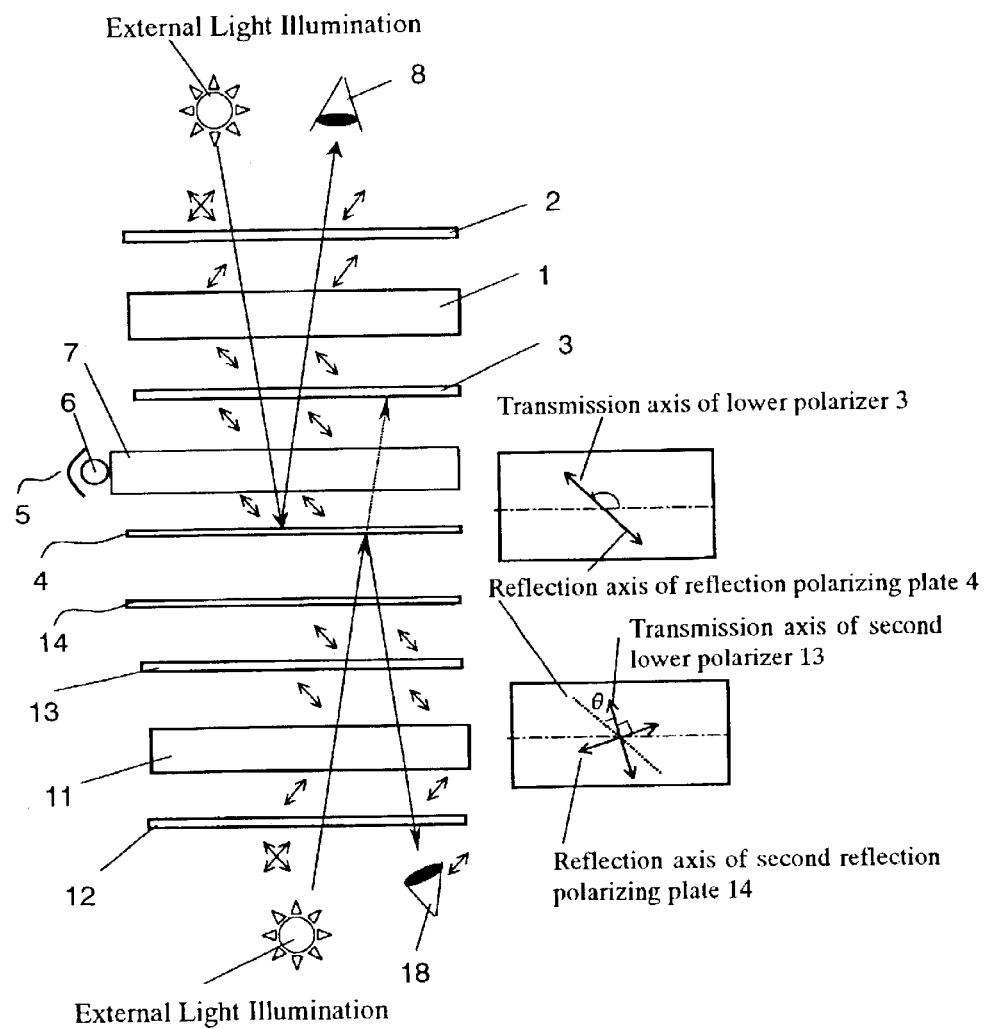
FIG. 5 is a sectional constitution view of a liquid crystal display apparatus according to a fifth embodiment of the invention schematically showing a case of observing by utilizing external light.

According to the embodiment, there is constructed a constitution of providing a second reflection-polarizing plate between the reflection-polarizing plate 4 and the second lower polarizer 13 in addition to the above-described constitution of Embodiment 4. The embodiment will be explained in details in reference to FIG. 5 and FIG. 6. However, an explanation of a portion thereof duplicated with Embodiment 4 will be omitted.

According to the embodiment, a reflection axis of a second reflection-polarizing plate 14 provided between the reflection polarized light 4 and the second lower polarizer 13 is orthogonal to the transmission axis of the second lower polarizer 13. That is, according to the constitution of the embodiment, the reflection axis of the reflection-polarizing plate 4 is set to coincide with the transmission axis of the lower polarizer 3, the transmission axis of the second lower polarizer 13 is set to intersect with the reflection axis of the reflection-polarizing plate by an angle θ (θ≠90°) and the reflection axis of the second reflection-polarizing plate 14 is set to be orthogonal to the transmission axis of the second lower polarizer 13, respectively. The case of observing the display apparatus having such a constitution will be explained in reference to FIGS. 5 and 6. However, the case of observing the liquid crystal panel 1 and the second liquid crystal panel 11 by reflection is similar to the above-described case of Embodiment 4 and therefore, a detailed explanation thereof will be omitted.

Figure 6:
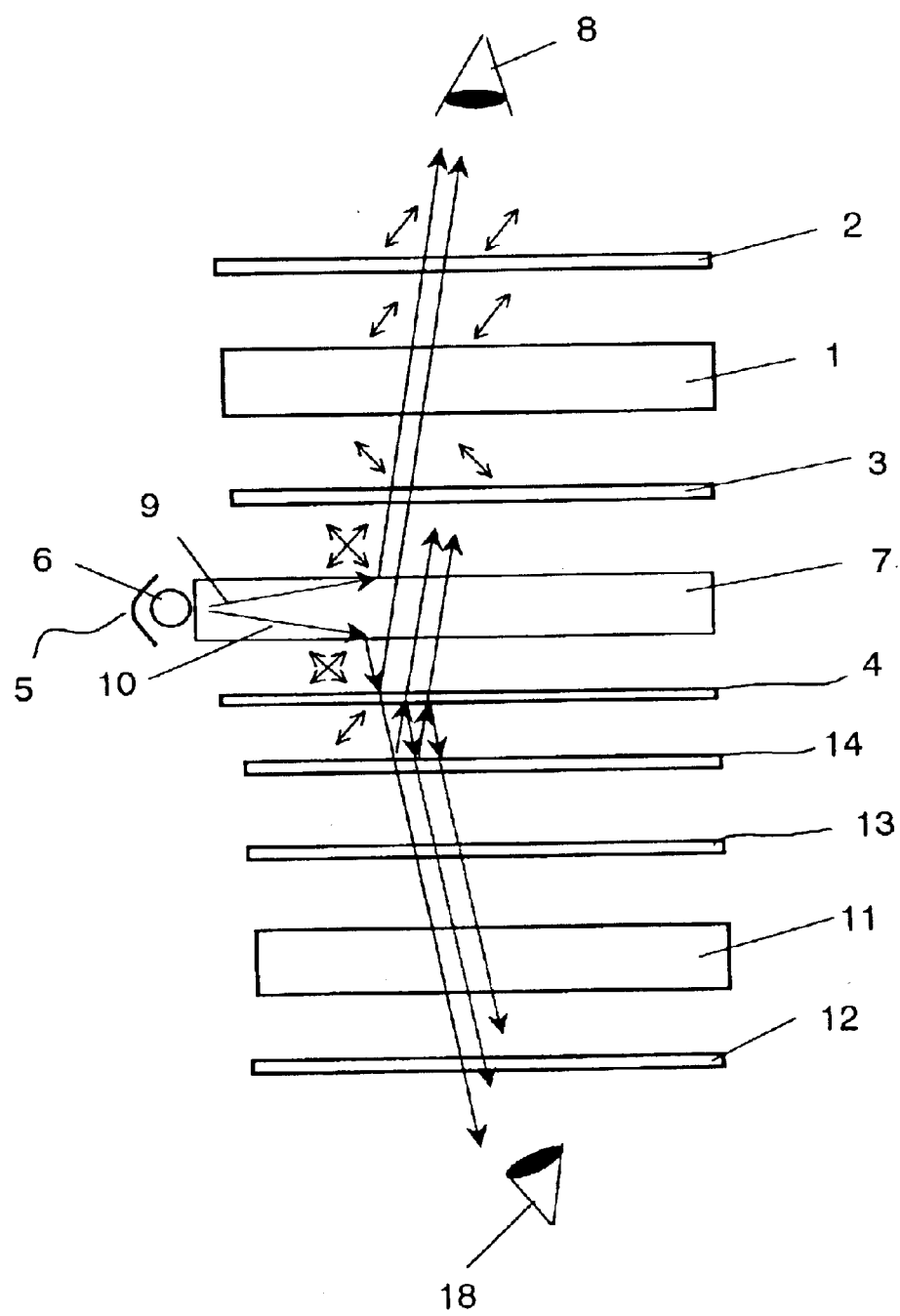
FIG. 6 is a sectional constitution view of the liquid crystal display apparatus according to the fifth embodiment of the invention schematically showing a case of observing by utilizing an illuminating apparatus.

Next, the case of observing the liquid crystal panel by transmission will be explained. As shown by FIG. 6, the case of observing the liquid crystal panel 1 by transmission by the illuminating light 9 emitted from the light guide plate 7 to the side of the liquid crystal panel 1 is similar to that of the case of Embodiment 4 and therefore, an explanation will be given of the illuminating light 10 emitted from the light guide plate 7 to the side of the reflection-polarizing plate on a side opposed to the liquid crystal panel 1. In the illuminating light 10, a component in a direction of the reflection axis of the reflection-polarizing plate 4 is reflected by the reflection-polarizing plate 4 and directed to the first liquid crystal panel 1 by transmitting through the light guide plate 7. Meanwhile, a component of the illuminating light 10 other than in the direction of the reflection axis of the reflection-polarizing plate 4 transmits through the reflection-polarizing plate 4. In the light transmitting through the reflection-polarizing plate 4, a component other than in the direction of the reflection axis of the second reflection-polarizing plate 14 transmits also through the second reflection-polarizing plate 14, and a component in the direction of the reflection axis of the second reflection-polarizing plate 14 is reflected and reaches the reflection-polarizing plate 4 again. Also the component in the direction of the reflection axis of the reflection-polarizing plate of light reaching again the reflection-polarizing plate 4 is similarly reflected and the other component transmits therethrough. In this way, illuminating light transmitting through the reflection-polarizing plate 4 repeats multiple reflection between the reflection-polarizing plate 4 and the second reflection-polarizing plate 14. In repeating the multiple reflection, a portion of the illuminating light is emitted from the reflection-polarizing plate 4 in the direction of the liquid crystal panel 1 and a portion thereof is emitted from the second reflection-polarizing plate 14 in the direction of the second liquid crystal panel 11. Therefore, a large portion of the illuminating light transmitting through the reflection-polarizing plate 4 can be emitted from either of the reflection-polarizing plates. However, in setting the above-described respective optical elements, light transmitting through the reflection-polarizing plate 4 is absorbed by the lower polarizer 3. Meanwhile, light transmitting through the second reflection-polarizing plate 14 reaches the second lower polarizer 13. Light emitted from the second reflection-polarizing plate is a component of light in the direction of the transmission axis of the second lower polarizer 13 and therefore, the light transmits therethrough and reaches the observer via the second liquid crystal panel 11 and the second upper polarizer 12. In this way, the multiple reflection is repeated between the reflection-polarizing plate 4 and the second reflection-polarizing plate 14, the efficiency of utilizing the illuminating light is increased by an amount of the optical component of light emitted from the second reflection-polarizing plate 14 and the brightness of the second liquid crystal panel is increased.

(Embodiment 6)

Figure 7:
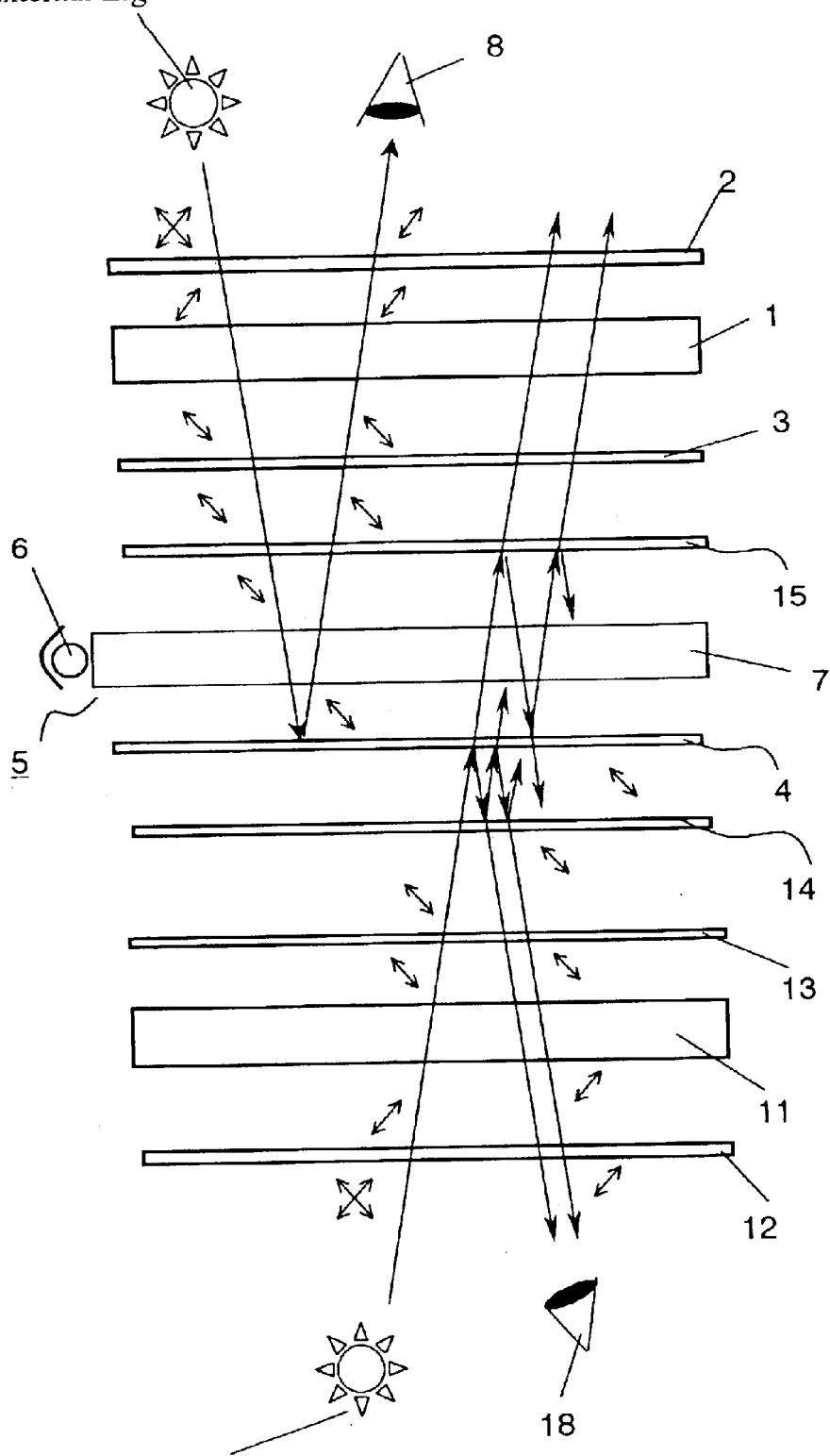
FIG. 7 is a sectional constitution view of a liquid crystal display apparatus according to a sixth embodiment of the invention schematically showing a case of observing by utilizing external light.

According to the embodiment, there is constructed a constitution of providing a third reflection-polarizing plate between the light guide plate 7 and the lower polarizer 3 in addition to the above-described constitution of Embodiment 5. The embodiment will be explained in details in reference to FIG. 7 and FIG. 8. However, an explanation of portions duplicated with Embodiment 4 and Embodiment 5, mentioned above, will be omitted.

According to the embodiment, a reflection axis of a third reflection-polarizing plate 15 provided between the light guide plate 7 and the lower polarizer 3 is orthogonal to the reflection axis of the reflection-polarizing plate 4. In other words, a direction of the reflection axis of the third reflection-polarizing plate 15 coincides with the direction of the absorption axis of the lower polarizer 3. That is, according to the constitution of the embodiment, the reflection axis of the reflection-polarizing plate 4 and the transmission axis of the lower polarizer 3 are set to coincide with each other, the transmission axis of the second lower polarizer 13 is set to intersect with the reflection axis of the reflection-polarizing plate 4 by an angle θ (θ≠90°), the reflection axis of the second reflection-polarizing plate 14 is set to be orthogonal to the transmission axis of the lower polarizer 13 and the reflection axis of the third reflection-polarizing plate 15 is set to be orthogonal to the reflection axis of the reflection-polarizing plate 4, respectively. The case of observing the display apparatus having such a constitution will be explained in reference to FIGS. 7 and 8.

In the case of observing the liquid crystal panel 1 by reflection, the direction of the absorption axis of the lower polarizer 3 coincides with the direction of the reflection axis of the third reflection-polarizing plate 15 and therefore, light transmitting through the lower polarizer 3 transmits through the light guide plate 7 without being reflected by the third reflection-polarizing plate 15 and is reflected by the reflection-polarizing plate 4 similar to Embodiment 4. In this way, the case is substantially similar to the case of Embodiment 4 and therefore, a detailed explanation thereof will be omitted.

In the case of observing the second liquid crystal panel 11 by reflection, a polarized light component in a direction of the absorption axis of the second upper polarizer 12 of external light incident on the display element from the side of the observer 18 is absorbed when transmitting through the second upper polarizer 12 and the remaining component is incident on the second liquid crystal panel 11. The incident light is emitted from the second liquid crystal panel 11 while converting the polarizing direction in accordance with the twist angle of the liquid crystal molecules, and a polarized light component thereof coinciding with the absorption axis of the second lower polarizer is absorbed by the second lower polarizer 13 and the remaining component transmits therethrough. Normally, a linearly polarized light direction of light emitted from the second liquid crystal panel 11 and the direction of the transmission axis of the second lower polarizer are made to coincide with each other. Further, light transmitting through the second lower polarizer 13 reaches the second reflection-polarizing plate 14. In this case, the transmission axis of the second lower polarizer 13 and the reflection axis of the second reflection-polarizing plate 14 are orthogonal to each other and therefore, light transmitting through the second lower polarizer 13 transmits therethrough as it is without being reflected by the second reflection-polarizing plate 14 and reaches the reflection-polarizing plate 4. In this case, the reflection axis of the reflection-polarizing plate 4 is set to shift from the transmission axis of the second lower polarizer 13 by an angle θ. Therefore, in a polarized light component transmitting through the second lower polarizer 13 and the second reflection-polarizing plate 14, a component thereof in the direction of the reflection axis of the reflection-polarizing plate 4 is reflected by the reflection-polarizing plate 4, transmits again through the second reflection-polarizing plate 14 and the second lower polarizer 13, tracks back the incident path, emitted from the second upper polarizer 12 and reaches the observer 18. Meanwhile, a component thereof which is not in the direction of the reflection axis of the reflection-polarizing plate 4, that is, a component in the direction of the transmission axis of the reflection-polarizing plate 4 transmits through the reflection-polarizing plate 4, transmits through the light guide plate and reaches the third reflection-polarizing plate. Directions of the reflection axes of the reflection-polarizing plate 4 and the third reflection-polarizing plate are orthogonal to each other and therefore, the component passing through the reflection-polarizing plate 4 is reflected by the third reflection-polarizing plate 15 and is directed again to the reflection-polarizing plate 4. In this way, the component of transmitting through the reflection-polarizing plate 4 of light transmitting through the second lower polarizer 13 and the second reflection-polarizing plate 14 is subjected to multiple reflection between the third reflection-polarizing plate 15 and the reflection-polarizing plate 4. In repeating the multiple reflection, a polarizing axis is changed in transmitting through or reflecting by an interface of the light guide plate or each constituent member and the light is emitted to the side of the lower polarizer 3 and the side of the second reflection-polarizing plate 14. A polarizing direction of light emitted to the side of the lower polarizer 3 therein is the same as the transmission axis of the lower polarizer 3 and therefore, transmits through the lower polarizer 3 and emitted to the liquid crystal panel 1 and reaches the side of the observer 8. Meanwhile, a component transmitting from the reflection-polarizing plate 4 to the side of the second reflection-polarizing plate 14 is subjected to multiple reflection between the second reflection-polarizing plate 14 and the reflection-polarizing plate 4. In repeating the multiple reflection, the light is emitted to the side of the third reflection-polarizing plate 15 and the side of the second lower polarizer 13. Light emitted to the side of the second lower polarizer 13 reaches the observer since the polarizing direction is the same. Light emitted to the side of the third reflection-polarizing plate 15 repeats multiple reflection between the reflection-polarizing plate 4 and the third reflection-polarizing plate 15 as described above. As a result, the multiple reflection is repeated between the third reflection-polarizing plate 15 and the reflection-polarizing plate 4 and between the reflection-polarizing plate 4 and the second reflection-polarizing plate 14 and the light reaches the liquid crystal panel 1 and the second liquid crystal panel and is observed by the observer. In this way, the light incident on the side of the liquid crystal panel by transmitting through the upper polarizer is hardly absorbed by respective constituent elements and reaches either of the observers. Therefore, the efficiency of utilizing light is increased.

Next, the case of observing the first liquid crystal panel 1 and the second liquid crystal panel 11 by transmission display will be explained.

Figure 8:
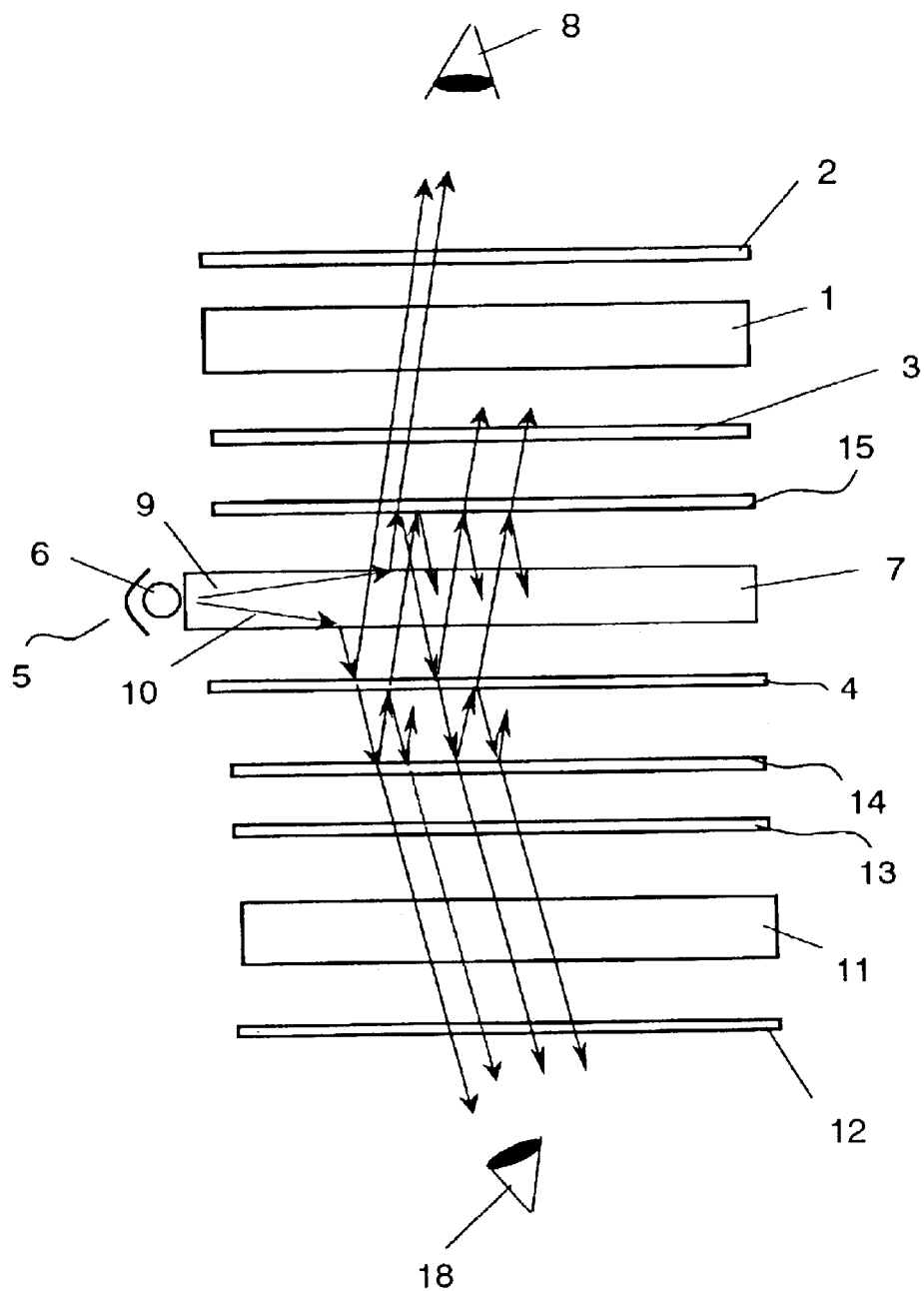
FIG. 8 is a sectional constitution view of the liquid crystal display apparatus according to the sixth embodiment of the invention schematically showing a case of observing by utilizing an illuminating apparatus.

As shown by FIG. 8, in the illuminating light 9 emitted from a face of the light guide plate on the side of the observer 8, a component other than in the direction of the reflection axis of the third reflection-polarizing plate 15 transmits through the third reflection-polarizing plate 15 and is observed by the observer 8 by transmitting through the lower polarizer 3, the liquid crystal panel 1 and the upper polarizer 2. The remaining component, that is, a component in the direction of the reflection axis of the third reflection-polarizing plate 15 in the illuminating light 9 is reflected by the third reflection-polarizing plate 15, transmits through the light guide plate 7 and reaches the reflection-polarizing plate 4. A component of light which reaches the reflection-polarizing plate 4 and is reflected again by the reflection-polarizing plate 4 repeats multiple reflection between the third reflection-polarizing plate 15 and the reflection-polarizing plate 4. Meanwhile, a portion of a component of the light reaching the reflection-polarizing plate 4 and transmitting through the reflection-polarizing plate 4 is reflected by the second reflection-polarizing plate 14, subjected to multiple reflection between the reflection-polarizing plate 4 and the second reflection-polarizing plate 14, a portion thereof transmits through the second reflection-polarizing plate 14 and is observed by the observer 18 via the second lower polarizer 13, the second liquid crystal panel 11 and the second upper polarizer 12.

In repeating the multiple reflection between the third reflection-polarizing plate 15 and the reflection-polarizing plate 4, a portion thereof is emitted to the side of the liquid crystal panel 1 by transmitting through the third reflection-polarizing plate 15 and reaches the observer 8. A portion thereof is emitted to the side of the second reflection-polarizing plate 14 by transmitting through the reflection-polarizing plate 4 and repeats multiple reflection between the second reflection-polarizing plate 14 and the reflection-polarizing plate 4.

In repeating multiple reflection between the second reflection-polarizing plate 14 and the reflection-polarizing plate 4, a portion thereof is emitted to the side of the second liquid crystal panel 11 by transmitting through the second reflection-polarizing plate 14 and is observed by the observer 18. A portion thereof transmits through the reflection-polarizing plate 4 and is again subjected to the multiple reflection between the reflection-polarizing plate 4 and the third reflection-polarizing plate.

In this way, a component other than in the direction of the reflection axis of the third reflection-polarizing plate 15 in the illuminating light 9 emitted to the side of the liquid crystal panel 1, transmits through the third reflection-polarizing plate 15 and observed by the observer 8 and the component in the direction of the reflection axis of the third reflection-polarizing plate 15 reaches either of the observer 8 and the observer 18 in repeating multiple reflection between the third reflection-polarizing plate and the reflection-polarizing plate 4 and between the reflection-polarizing plate 4 and the second reflection-polarizing plate 14. Therefore, the illuminating light 9 emitted to the side of the first liquid crystal panel 1 reaches either of the observer 8 and 18.

Similarly, a component of the illuminating light 10 emitted from the face of the light guide plate on the side of the second liquid crystal panel 11 in the direction of the reflection axis of the reflection-polarizing plate 4 is reflected by the reflection-polarizing plate 4 and reaches the observer by transmitting through the third reflection-polarizing plate 15. Meanwhile, a component thereof other than in the direction of the reflection axis of the reflection-polarizing plate 4 transmits through the reflection-polarizing plate 4 and reaches the second reflection-polarizing plate 14. In the light reaching the second reflection-polarizing plate 14, a portion thereof is emitted to the side of the second liquid crystal panel 11 by transmitting through the second reflection-polarizing plate 14 to reach the observer 18 and a portion thereof is reflected by the second reflection-polarizing plate 14 and repeats multiple reflection between the reflection-polarizing plate 4 and the second reflection-polarizing plate 14. In repeating the multiple reflection, a portion thereof reaches the observer 18 by transmitting through the second reflection-polarizing plate and a portion thereof transmits through the reflection-polarizing plate 4 and repeats multiple reflection between the third reflection-polarizing plate 15 and the reflection-polarizing plate 4.

In this way, also the illuminating light 10 emitted to the side of the second liquid crystal panel 11 reaches either of the observer 8 and the observer 18.

As explained above, the light of the illuminating apparatus reaches either of the observer 8 and the observer 18 and therefore, the efficiency of utilizing the illuminating light is increased and brightness is increased both in the first liquid crystal panel and the second liquid crystal panel.

Figure 9:
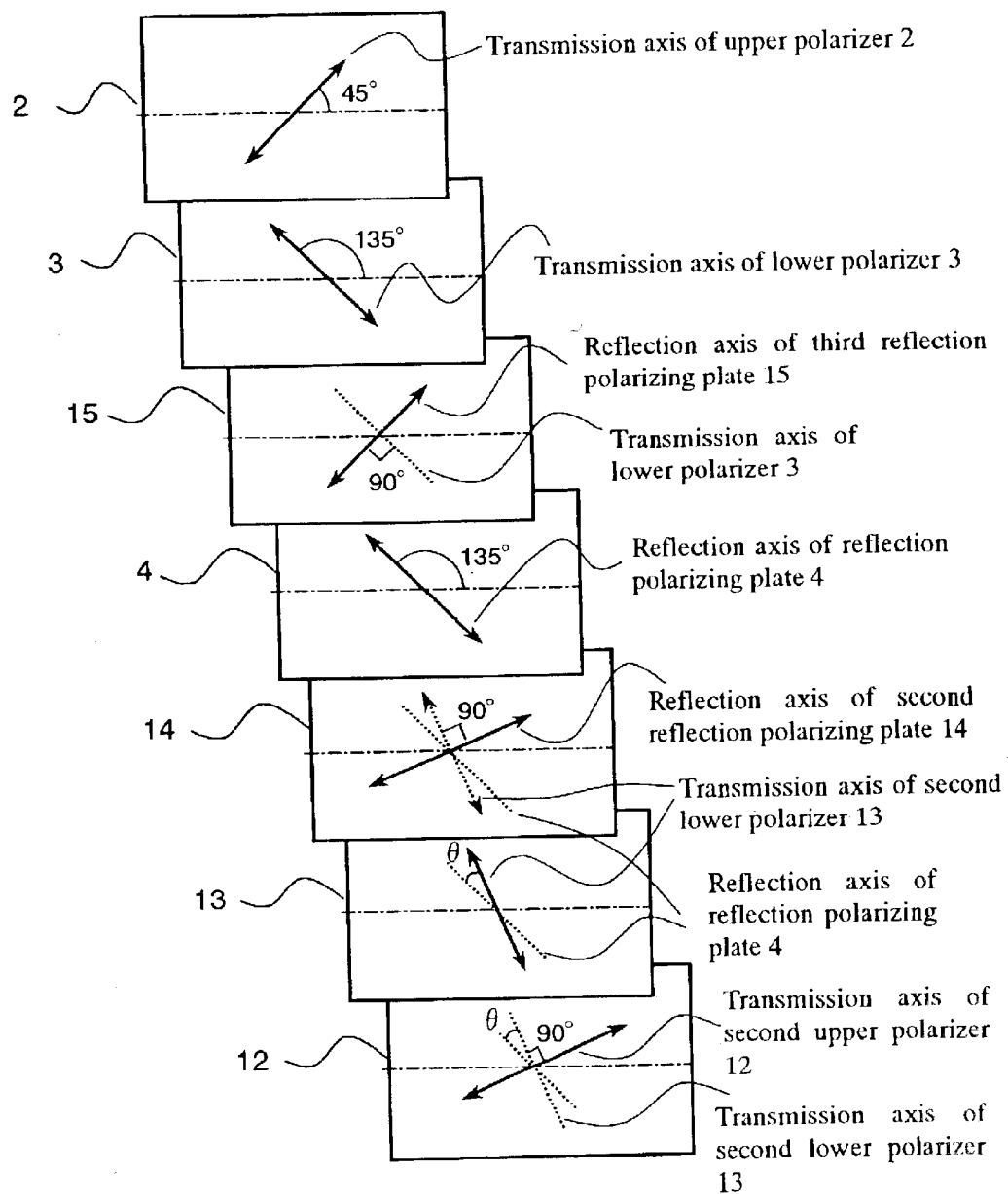
FIG. 9 is a schematic diagram exemplifying an axis direction of a principal optical element according to the sixth embodiment of the invention.
Figure 10:
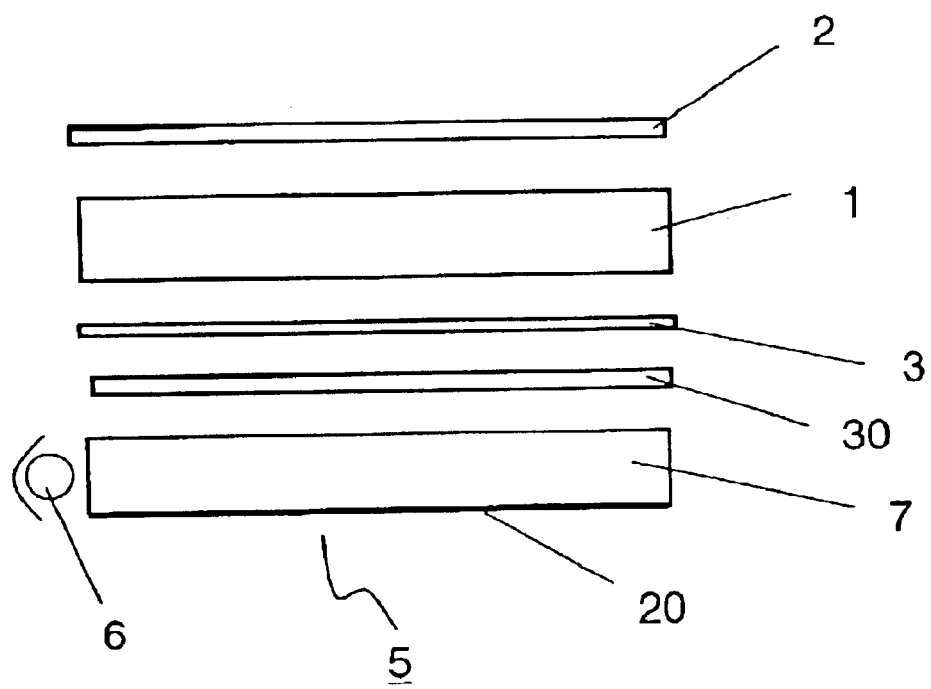
FIG. 10 is a schematic sectional view showing a constitution of a liquid crystal display apparatus of a related art.

The case of applying the constitution of the embodiment to a liquid crystal panel of a TN type will be explained in details in reference to FIG. 9. FIG. 9 is a diagram for explaining angles of installing a transmission axis and a reflection axis of a constituent element of the embodiment. The diagram shows a state of being observed perspectively from the side of the observer 8 and laminated rectangular shapes indicate the upper polarizer 2 and the lower polarizer 3, the third reflection-polarizing plate 15, the reflection-polarizing plate 4, the second reflection-polarizing plate 14, the second lower polarizer 13 and the second upper polarizer 12 successively from above and axis directions thereof are indicated by arrow marks. The transmission axis of the upper polarizer 2 is set to 45°. The liquid crystal panel 1 using TN type liquid crystals converts the polarizing direction by 90°. In order to efficiently transmit the light converted to 90°, the transmission axis of the lower polarizer 3 is fixed to be orthogonal to the upper polarizer 2, that is, to 135°. The reflection axis of the third reflection-polarizing plate 15 is arranged at 45° to be orthogonal to the transmission axis of the lower polarizer 3. Further, the reflection axis of the reflection-polarizing plate 4 is set to be the same as 135° in order to efficiently reflecting the light transmitting through the lower polarizer 3. The angle of the transmission axis of the second lower polarizer 13 is shifted from the reflection axis of the reflection-polarizing plate 4 by an angle θ in accordance with a rate or reflection and transmission. Further, both of the reflection axis of the second reflection-polarizing plate 14 and the transmission axis of the second upper polarizer 12 are shifted from being orthogonal to θ in accordance with the angle. That is, the reflection axis of the second reflection-polarizing plate 14 and transmission axis of the second upper polarizer 12 are orthogonal to the transmission axis of the second lower polarizer 13.

Although the case of using the liquid crystal display element of the TN type is exemplified here, also the case of constituting by adding an optical compensating plate of a phase difference plate or the like by using a liquid crystal display element of an STN type basically stays the same.

As explained above, according to the liquid crystal display apparatus of the invention, there can be realized the liquid crystal display apparatus which is bright both in reflecting and transmitting and is provided with an excellent display quality by a small number of parts.

Particularly, in the case of arranging the liquid crystal panels on the two faces of the light guide plate, an amount of light utilized in displaying the liquid crystal panels can arbitrarily be distributed to change. Further, almost all of the light source can be made to contribute to illumination of either of the upper side liquid crystal panel or the lower side liquid crystal panel and the efficiency of utilizing the light source is remarkably increased.

Therefore, the liquid crystal display apparatus which is bright both in reflecting and transmitting and is provided with excellent display quality can be provided. Thereby, commercial value can be promoted in the field of electronic apparatus starting from camera, portable telephone and timepiece frequently using the liquid crystal display apparatus in the civil product market.

What is claimed is:
1. A liquid crystal display apparatus comprising:
a first and a second liquid crystal panel each interposing a liquid crystal between substrates opposed to each other;
an illuminating apparatus provided between the first liquid crystal panel and the second liquid crystal panel;
a first lower polarizer provided between the first liquid crystal panel and the illuminating apparatus;
a second lower polarizer provided between the second liquid crystal panel and the illuminating apparatus; and
a reflection-polarizing plate provided between the illuminating apparatus and the second lower polarizer;
wherein the reflection-polarizing plate reflects a polarized light component in a specific direction and transmits a remaining polarized light component.

2. A liquid crystal display apparatus according to claim 1, wherein a transmission axis of the first lower polarizer and a reflection axis of the reflection-polarizing plate are aligned in a same direction and a transmission axis of the second lower polarizer is set to make an angle other than 90 degrees relative to the reflection axis of the reflection-polarizing plate.

3. A liquid crystal display apparatus according to claim 2, further comprising: a second reflection-polarizing plate provided between the reflection-polarizing plate and the second lower polarizer.

4. A liquid crystal display apparatus according to claim 3, wherein a reflection axis of the second reflection-polarizing plate is set to be orthogonal to the transmission axis of the second lower polarizer.

5. A liquid crystal display apparatus according to claim 3, further comprising: a third reflection-polarizing plate between the first lower polarizer and the illuminating apparatus.

6. A liquid crystal display apparatus according to claim 5, wherein a reflection axis of the third reflection-polarizing plate is orthogonal to the reflection axis of the reflection-polarizing plate.

7. A liquid crystal display apparatus comprising:
a liquid crystal panel interposing a liquid crystal between substrates opposed to each other; a lower polarizer provided on a back side of the liquid crystal panel; an illuminating apparatus provided on a back side of the lower polarizer; and a reflection-polarizing plate provided on a rear side of the illuminating apparatus for reflecting a polarized light component in a specific direction and transmitting a remaining polarized component; wherein a transmission axis of the lower polarizer and a reflection axis of the reflection-polarizing plate are aligned.

* * * * *